(12) United States Patent
Sema

(10) Patent No.: US 11,945,479 B2
(45) Date of Patent: Apr. 2, 2024

(54) SELF-LEARNING WARNING SYSTEM FOR RAIL VEHICLES

(71) Applicant: Siemens Mobility GmbH, Munich (DE)

(72) Inventor: Albi Sema, Berlin (DE)

(73) Assignee: Siemens Mobility GmbH, Munich (DE)

( * ) Notice: Subject to any disclaimer, the term of this patent is extended or adjusted under 35 U.S.C. 154(b) by 0 days.

(21) Appl. No.: 18/259,404

(22) PCT Filed: Dec. 20, 2021

(86) PCT No.: PCT/EP2021/086705
§ 371 (c)(1),
(2) Date: Jun. 27, 2023

(87) PCT Pub. No.: WO2022/161701
PCT Pub. Date: Aug. 4, 2022

(65) Prior Publication Data
US 2024/0043053 A1    Feb. 8, 2024

(30) Foreign Application Priority Data

Jan. 28, 2021    (DE) ...................... 10 2021 200 767.8

(51) Int. Cl.
*B61L 23/04*       (2006.01)
*G06V 10/82*       (2022.01)
*G06V 20/58*       (2022.01)

(52) U.S. Cl.
CPC ............ *B61L 23/041* (2013.01); *G06V 10/82* (2022.01); *G06V 20/58* (2022.01)

(58) Field of Classification Search
CPC ......... B61L 23/041; B61K 9/08; G01B 11/22; G06V 10/82; G06V 20/58; G06T 2207/30236; B60L 2200/26
See application file for complete search history.

(56) References Cited

U.S. PATENT DOCUMENTS

| 10,144,441 B2 | 12/2018 | Fischer et al. | |
| 2014/0218482 A1* | 8/2014 | Prince | B61L 29/32 348/47 |

(Continued)

FOREIGN PATENT DOCUMENTS

| EP | 3048559 A1 | 7/2016 |
| EP | 3431361 A2 | 1/2019 |

(Continued)

OTHER PUBLICATIONS

Christiansen, P. et al: "Deep Anomaly: Combining Background Subtraction and Deep Learning for Detecting Obstacles and Anomalies in an Agricultural Field. Sensors"; Nov. 11, 2016, vol. 16, No. 11, p. 1904, DOI: 10.3390/s16111904.

*Primary Examiner* — Kenneth J Malkowski
(74) *Attorney, Agent, or Firm* — Laurence A. Greenberg; Werner H. Stemer; Ralph E. Locher

(57) ABSTRACT

In a method for detecting obstacles for a rail vehicle, 3D sensor data is detected from a surrounding region, 3D image data is generated from the 3D sensor data, and 2D image data is generated on the basis of the 3D image data. A 2D anomaly mask is ascertained or generated by comparing the 2D image data with reference image data which is free of a collision obstacle. In the process, image regions are identified as mask regions in the 2D image data which differ from the corresponding image regions in the reference image data. By fusing the 2D anomaly mask with the 3D image data, a 3D anomaly mask is generated in the 3D image data. Finally, the 3D image data which is part of the 3D anomaly mask is interpreted as a possible collision obstacle. There is also described an obstacle detection device and a rail vehicle.

16 Claims, 5 Drawing Sheets

(56) References Cited

U.S. PATENT DOCUMENTS

2017/0066459 A1* 3/2017 Singh .................. G06F 18/2431
2018/0297621 A1* 10/2018 Matson ................. B61L 25/025
2021/0279488 A1 9/2021 Dolberg et al.

FOREIGN PATENT DOCUMENTS

| EP | 3663881 A1 | 6/2020 |
| WO | WO 2018104454 A2 | 6/2018 |
| WO | WO 2020012475 A1 | 1/2020 |

* cited by examiner

SELF-LEARNING WARNING SYSTEM FOR RAIL VEHICLES

FIELD AND BACKGROUND OF THE INVENTION

The invention relates to a method of obstacle detection in the environment of a rail vehicle. In addition, the invention relates to an on-board obstacle detection facility for a rail vehicle. The invention relates, moreover, to a rail vehicle.

In rail transport the situation occasionally occurs where objects, such as, for example, people or road vehicles, shopping carts, which have been thrown onto the rails, or also boulders or fallen trees, end up on the track system and therefore represent a risk to the safety of the rail traffic and in the case of people and road vehicles are also themselves at extremely high risk, owing to the possibility of a collision with a moving rail vehicle. Such objects have to be detected in good time therefore in order for an approaching rail vehicle to initiate a braking process, so a collision between the rail vehicle and the detected objects can be prevented.

Detection of possible obstacles of any form or shape, which block the rails, is a safety-critical necessity for all types of rail vehicle therefore. There are many approaches to this problem, with approaches based on artificial intelligence (abbreviated to AI) being the most promising. Any AI-based solution is only as good as its training database, which is very complex to compile and annotate for rail traffic scenarios. Since potential obstacles of any kind and any shape and form have to be detected and identified, methods of obstacle detection, which are based solely on camera image data, are not suitable. This is because in these methods, image features are learned, and this is very object-specific and is therefore not very suitable for a sufficiently safe, general approach. On the other hand, such a general approach can be implemented with a method in which sensor data is captured with LIDAR sensors and represented as a point cloud. However, this approach has the drawback that a very long processing time is required for the captured data and this approach is not especially suitable for real-time requirements therefore. With said methods, parameters based on the surroundings, to which they are applied, are usually set non-adjustably.

In contrast to cars, most types of rail vehicle travel on known routes having a specific timetable and frequently travel these routes several times a day. In addition, usually scarcely anything changes on the rail routes and these are conventionally situated in regions separate and remote from other traffic situations and are normally free of obstacles which could block their path. In particular, rail vehicles which travel longer routes, such as regional trains or Intercity trains, use routes, which are situated in a sparsely populated area, so it is unlikely that anything will block their railroad line. In addition, these trains travel according to timetables. They therefore always frequent the same region at the same time. As a consequence of the consistency of space and time the complexity of the sensor data is reduced and allows algorithms, which can hardly be generalized for the automotive sector, to adapt to the surroundings of the rails.

There are different approaches in order to implement a real-time detection of anomalies in the region of rails without prior parameterization.

For example, cameras are used as object detectors. Methods of object detection or segmentation of images are used for evaluating the image data generated by the cameras, with objects being grouped into as many categories as possible. AI-based approaches of this kind use extensive, generally accessible datasets, which are enhanced with additional field data, as the database in order to obtain the best detection results and detect as many objects as possible. The problem with these approaches consists in that potentially not all types of obstacle are detected thereby because some of them are potentially not included in the training datasets irrespective of how many objects they can actually detect.

Alternatively, static or fixed sensors are also used for object detection. These sensors can comprise any types of motion sensors, thermal image cameras or CCTV cameras, which are arranged along a railroad line. In the case of motion sensors or thermal image cameras, the detection of any objects can be achieved if a threshold for a specific movement or temperature is known. When CCTV cameras are used the background is removed in order to discover any pixels in the image which do not belong to the background. However, these approaches are associated with high costs since the sensors used have to be positioned along the entire route and, in addition, have to have a fast communications link to the rail transport system in order to be able to warn a rail vehicle in real time.

Furthermore, there are attempts to detect objects in point clouds, which are generated by LIDAR sensors. There are AI-based methods and conventional model-based methods in this connection. AI-based methods are quite successful in the detection of large objects, such as cars, but they have problems detecting smaller objects, such as people. In addition, with AI-based methods a lot of data has to be processed such that the processing can hardly be accomplished in real time even by high-performance computers. Conventional methods of processing point clouds use technologies, such as a clustering of the filtering, in order to detect anomalies. Such methods have many fixed parameters, which can only be optimized by a lengthy test process even if it is possible at all.

SUMMARY OF THE INVENTION

It is therefore the object to provide a method and an apparatus for detecting and identifying obstacles for rail vehicles, which better satisfy requirements of a real-time function, a general applicability and reliability than the above-mentioned approaches.

This object is achieved by a method of obstacle detection for a rail vehicle as claimed, an obstacle detection facility for a rail vehicle as claimed and a rail vehicle as claimed.

With the inventive method of obstacle detection for a rail vehicle, 3D sensor data is captured from a surrounding area of the rail vehicle. The surroundings of the rail vehicle captured by way of sensors preferably comprises a travel channel of the rail vehicle extending before the rail vehicle, but can also preferably comprise peripheral regions to the right and left of the travel channel in order to, for example, detect potential collision obstacles in good time before they have even arrived in the vicinity of the travel channel.

Three-dimensional image data is generated on the basis of the 3D sensor data. In contrast to 2D sensor data, 3D sensor data comprises depth information about the monitored surrounding area. Two-dimensional image data is in turn generated on the basis of the 3D image data. For this, the 3D image data is projected onto a 2D plane whose orientation preferably coincides with the viewing perspective of the rail vehicle. This viewing perspective also preferably comprises the perspective of a driver looking out of the rail vehicle to the front or in the direction of travel and/or the perspective with which at least some of the sensors, which are preferably oriented in the direction of travel or direction of the longitudinal axis of the rail vehicle, detect the surrounding area.

When 2D data or 3D data is mentioned in the application, two-dimensional data or three-dimensional data is thus always intended thereby.

Furthermore, a 2D anomaly mask is ascertained or generated by comparing the projected 2D image data having reference image data that is free of an obstacle and generated, for example, in advance or in real time or even at the same time as the projected 2D image data. Image regions are identified as mask regions for a 2D anomaly mask in the projected 2D image data, which are not included in the reference image data or, to put it another way, which differ from the corresponding image regions of the reference image data, the image regions in the reference image data arranged at the same image position, therefore. For example, these image regions have a different intensity or different grayscale or a different contrast in the projected 2D image data than in the reference image data. For better comparability the reference image data preferably likewise comprises 2D image data. In contrast to the projected 2D image data, the reference image data reproduces a scenario of the surrounding area monitored by sensors in which no collision obstacles occur. The 2D anomaly mask in the projected 2D image data therefore comprises the image regions of the projected 2D image data in which, compared to the reference image data, a difference occurs. For example, a differential image can be generated for this in which the regions with high intensity or the light regions point toward anomalies or potential collision obstacles. To be able to assign the correct reference image data to the 2D image data the position of the rail vehicle can be determined, for example when generating the reference image data. A position determination of the rail vehicle is then likewise carried out during acquisition of the 3D sensor data forming the basis of the 2D image data, so the correctly assigned reference image data can be compared with the current projected 2D image data on the basis of this information. Markings at the edge of the rail region, such as, for example, balises, landmarks, can also be used in combination with odometric methods and satellite navigation for position determination. As will be explained in detail later, it is even possible to dispense with the position determination of the rail vehicle if simply the same currently captured 3D sensor data forms the basis of the projected 2D image data and the reference image data.

In a subsequent step of the inventive method a 3D anomaly mask is generated in the 3D image data by fusing the 2D anomaly mask with the 3D image data. With fusion, the 2D anomaly mask is back-projected into the 3D image of the 3D image data. Finally the 3D image data incorporated by the 3D anomaly mask is interpreted as a possible collision obstacle. Owing to the integration of the 3D anomaly mask in the 3D image data it is also possible to immediately ascertain the position of the potential obstacle in the space or relative to the rail vehicle, so, as a function of this information, an appropriate automated reaction of the rail vehicle to the situation, such as, for example, an automated braking maneuver or generation of a warning signal, can be correctly ascertained and triggered. Advantageously, all types of obstacle of any form and shape may be detected with the inventive method of obstacle detection since the shape of an obstacle does not have to be learned or known and instead only the surroundings thereof or the surroundings of the rail vehicle has to be known as the basic scenario without collision obstacles. The object is detected on the basis of 2D projections, which, compared to 3D image data, have a very low data volume, so the effort for data processing for detection of collision obstacles is greatly reduced. The method can therefore be carried out in real time and it is also easy to train or re-train, as will be explained later in detail, since no objects have to be detected and the volume of data for processing is comparatively low.

A self-learning system or a system based on artificial intelligence can be used for generating the reference image data, which system is in a position, by way of a training method, to reconstruct reference image data without anomalies on the basis of sensor data captured by the sensors of the rail vehicle or image data obtained therefrom. The training method can then be effectively applied if the reference image data itself is to be reconstructed in real time on the basis of the sensor data captured by the sensors or the image data obtained therefrom, and is to be constantly updated during travel operation of the rail vehicle. No supervision by a specialist is required for the learning or training process. No dedicated training dataset that has been laboriously generated in advance is required either since the training data can be generated during the travel of the rail vehicle in phases in which no collision obstacle occurs. In particular, no expenditure for annotation and collation of such data by experts results either. No fixed parameterization of the object detection is required either since the method is self-learning and can be very well adapted to different routes. Advantageously, the sensor system is carried along with the rail vehicle, so no expensive installations of static sensors are required as infrastructure throughout the entire rail network. Similar to the principle of static sensors, a type of background is removed from the image of the surroundings in order to detect moving objects. Since the sensor data is captured starting from a moving object, however—that is to say, the rail vehicle —, it is not possible for movement to simply be detected in order to ascertain moving portions of the surroundings. Instead, for ascertaining the 2D anomaly mask the static portion of the surroundings is conversely ascertained either by staggered capture of the reference image data or by way of an AI-based reconstruction of the reference image data in which the changing portions of the surroundings become evident, and the static portion is then subtracted from the overall scenario of the surroundings. Advantageously, the strength of a system based on artificial intelligence is used so that it can react extremely flexibly to different scenarios. The reference image data can therefore be generated quickly and optionally in real time in the case of a change of route and be used immediately for collision obstacle detection.

The inventive obstacle detection facility has a sensor data interface for receiving 3D sensor data from a surrounding area of a rail vehicle, on or in which the obstacle detection facility is arranged. Part of the inventive obstacle detection facility is also an image-generating unit for generating 3D image data on the basis of the 3D sensor data. The inventive obstacle detection facility also comprises a projection unit for generating 2D image data on the basis of the 3D image data by way of projection of the 3D image data onto a projection plane and a mask-generating unit for generating a 2D anomaly mask by comparing the 2D image data generated by way of projection with reference image data that is free of an obstacle. Image regions are identified as mask regions in the 2D image data, which are not included in the reference image data or differ from the corresponding image regions in the reference image data.

The inventive obstacle detection facility also comprises a fusion unit for generating a 3D anomaly mask in the 3D image data by fusing the 2D anomaly mask with the 3D image data. The inventive obstacle detection facility also has an obstacle-ascertaining unit for identifying the 3D image data incorporated by the 3D anomaly mask as a possible collision obstacle. The inventive obstacle detection facility shares the advantages of the inventive method of obstacle detection for a rail vehicle.

The inventive rail vehicle has a sensor unit for capturing 3D sensor data from the surroundings of the rail vehicle. In addition, the inventive rail vehicle comprises the inventive obstacle detection facility. Furthermore, the inventive rail vehicle has a control facility for controlling the travel behavior of the rail vehicle, as a function of whether the obstacle detection facility detected an obstacle in the surroundings of the rail vehicle. The inventive rail vehicle shares the advantages of the inventive obstacle detection facility.

Some components of the inventive obstacle detection facility can be embodied for the most part in the form of software components. This relates, in particular, to the image-generating unit, the mask-generating unit, the fusion unit and the obstacle-ascertaining unit.

Basically, these components can, however, also sometimes, in particular when particularly fast calculations are involved, be implemented in the form of software-supported hardware, for example FPGAs or the like. Similarly, the required interfaces, for example if it is merely a matter of acquiring data from other software components, can be embodied as software interfaces. They can, however, also be embodied as interfaces constructed in terms of hardware, which are actuated by suitable software.

An implementation largely in terms of software has the advantage that even computer systems that already exist in a rail vehicle can be easily retrofitted by way of a software update following a potential extension by way of additional hardware elements, such as additional sensor units, in order to operate inventively. In this regard the object is also achieved by a corresponding computer program product having a computer program, which can be directly loaded into a storage facility of a computer system of this kind, having program segments in order to carry out the steps of the inventive method, which can be implemented by way of software, when the computer program is executed in the computer system.

In addition to the computer program, a computer program product of this kind can optionally comprise additional constituent parts, such as, for example, documentation and/or additional components, also hardware components, such as, for example, hardware keys (dongles, etc.) in order to use the software.

A computer-readable medium, for example a memory stick, a hard disk or another transportable or permanently installed data carrier, on which the program segments of the computer program, which can be read in and executed by a computer unit, are stored, can serve for transportation to the storage facility of the computer system and/or for storage on the computer system. The computer unit can have, for example, one or more cooperating microprocessor(s) or the like for this purpose.

The dependent claims and the following description respectively contain particularly advantageous embodiments and developments of the invention. In particular, the claims of one category of claims can also be developed analogously to the dependent claims of a different category of claims and the descriptions thereof. In addition, the various features of different exemplary embodiments and claims can also be combined within the framework of the invention to form new exemplary embodiments.

In one embodiment of the inventive method of obstacle detection for a rail vehicle, for generating the 2D image data the 3D pixel data is projected onto a plane, which coincides with the perspective of a sensor unit of the rail vehicle used for capturing the 3D sensor data. The 2D image data therefore comprises virtually a 2D view of the 3D image generated on the basis of the sensor data. Advantageously, the same perspective is adopted in the 2D image data as in the 3D image data on whose basis it is generated.

The 3D sensor data preferably comprises LIDAR sensor data. The use of LIDAR sensors enables a particularly robust detection in the case of different light and weather conditions. A precise 3D detection by day, by night and in a tunnel may be achieved thereby. The 3D image data preferably comprises 3D pixel data or image point data, which can be obtained particularly preferably as point cloud data on the basis of the laser sensor data. The 2D image data and the reference image data can also be generated and represented as projected pixels. Advantageously, the volume of image data can be reduced by the use of pixel data or be adapted to technical boundary conditions, such as the computing capacity, the number of pixels of receptor areas of sensors, such as, for example, cameras, or the sampling density and sampling frequency of a LIDAR sensor.

The 2D image data preferably comprises an intensity image and a depth image, which is also referred to as a distance image. The depth image can itself be configured as a 2D depth image, but reproduces depth information by way of different image intensities, for example different grayscale values. The depth image is required for generating the 2D anomaly mask. The information of the depth image is used in the framework of a post-processing step to get rid of false-positive pixels or image points of the 2D anomaly mask. The depth image is subjected to some simple linear calculations in order to retain only the image points which have a depth which is greater than that of a basic plane. A basic plane in a 2D depth image is defined as the median pixel of each row of all predicted pixels without anomaly of the same row. The resulting anomaly image is checked to ascertain whether all image points or image regions, which were assigned anomalies, have a depth. If this is the case, they are retained as anomalies, if not, they are discarded.

If during the comparison of the projected 2D image data with the reference image data a differential image is generated in order to ascertain anomalies in the projected 2D image data, a threshold differential image can thus be generated as an intermediate step, after generation of the differential image, in which intensity data, which overshoots a predetermined threshold value, with a standardized high intensity is represented so as to be much lighter than in the differential image. Noise effects or interference effects on the generation of the 2D anomaly mask can be reduced in this way. This is because only image regions whose intensity or brightness overshoot a predetermined threshold value are classified as anomalies.

The projected 2D image data preferably comprises grayscale image data. Advantageously, the projected 2D image data may be processed particularly efficiently and quickly as grayscale image data since it occupies a much smaller volume of data than, for example, three-dimensional color image data. A real time detection of collision obstacles during travel of a rail vehicle may thus also be achieved more easily. Training of artificial intelligence on the basis of grayscale image data may also be carried out particularly quickly and so as to conserve resources, so a quick adaptation of a reconstruction of reference image data to changed routes or changed route conditions is possible.

Preferably, 2D reference image data, which does not comprise any obstacle objects, is reconstructed on the basis of the projected 2D image data. This procedure is possible in phases in which no collision obstacle occurs in the surrounding area and the 2D image data can therefore be used as reference image data, which reproduces a scenario without collision obstacle. But even if such a collision obstacle occurs, the 2D image data can be used as the basis for reference image data to be reconstructed. This procedure is advantageously possible when artificial intelligence, for example a neural network, is used for reconstruction of the 2D reference image data on the basis of the 2D image data. As will be explained later in more detail the artificial intelligence can be trained such that it skips or ignores the collision obstacles during the reconstruction of the reference image data, so they no longer occur in the reference image data even if they are present in the projected 2D image data. The reference image data is required to ascertain the obstacle objects virtually as a differential image without it having to be detected or classified by an algorithm. Advantageously, a classification of the obstacles is avoided in this way, whereby obstacle detection is fast and flexible.

The 2D reference image data is preferably reconstructed by artificial intelligence or an algorithm based on artificial intelligence, preferably an artificial neural network. An artificial neural network may be adapted particularly flexibly to different scenarios. Preferably, a variational autoencoder is used as an artificial neural network.

The artificial intelligence, in particular the neural network, is preferably trained for a reconstruction of reference image data during stages of travel in which the rail vehicle has a clear line. A "clear line" should be taken to mean a state in which the rail vehicle moves along unhindered by potential collision obstacles. No collision obstacles, which could disrupt the training of the artificial neural network, occur in these stages of travel therefore. The aim is to train the artificial neural network such that it detects or reconstructs to form image data all static features of the surroundings of a rail vehicle, which are present, for example, on a route which the rail vehicle regularly travels on according to a timetable, but does not detect any randomly occurring moving objects, such as people or vehicles, which could penetrate into the travel channel of the rail vehicle. The weakness of artificial intelligence, namely that it can classify and detect only the objects with which it is also being trained, is used as an advantage in this case in that the artificial intelligence is trained only, or almost only, with the static background objects of the surroundings and not, or only to a very small extent, with dynamic objects, in particular transport users, which can represent potential collision objects. An obstacle-free reference image may also be reconstructed on the basis of image data, which comprises such collision obstacles, by way of this specific training. This is because, owing to the specific training, the artificial neural network is blind with respect to the randomly occurring collision obstacles and does not detect them even during an image reconstruction of a current scenario in which such collision obstacles can occur. The reference image data is then in turn used to generate a differential image from the projected 2D image data comprising the collision obstacles, and the reference image data and thus identify and isolate the collision obstacles and use them as an anomaly mask. Even if potentially isolated collision obstacles occur during training and also enter into the training result, they do not carry weight and, as a rule, are not sufficient for adequately training the artificial intelligence to classify and identify the collision obstacles. Instead these objects are ignored as a marginal issue throughout the entire volume of data of the training data.

The stages of travel in which the rail vehicle has a clear line are preferably selected for training in terms of whether the rail vehicle is currently traveling at a predetermined minimum speed. It can namely be assumed that no collision obstacle has occurred or is occurring in the travel range of the rail vehicle if the rail vehicle maintains its speed or does not reduce it below a predetermined value. Alternatively, the travel behavior of the rail vehicle can also be ascertained over a route that is traveled on repeatedly and a tolerance range can be ascertained around a location-dependent average speed, at which the rail vehicle moves over the route. If the speed deviates from this tolerance range, in particular downwards, then it can be assumed that a potential collision obstacle is currently emerging and the rail vehicle must react to it. The current stage of travel or the reference image data captured precisely in this stage of travel is optionally discarded therefore in order to have no potential collision objects in the reference image data.

BRIEF DESCRIPTION OF THE FIGURES

The invention will be explained once again below with reference to the accompanying Figures on the basis of exemplary embodiments. In the drawings.

DETAILED DESCRIPTION OF THE INVENTION

Figure 1:
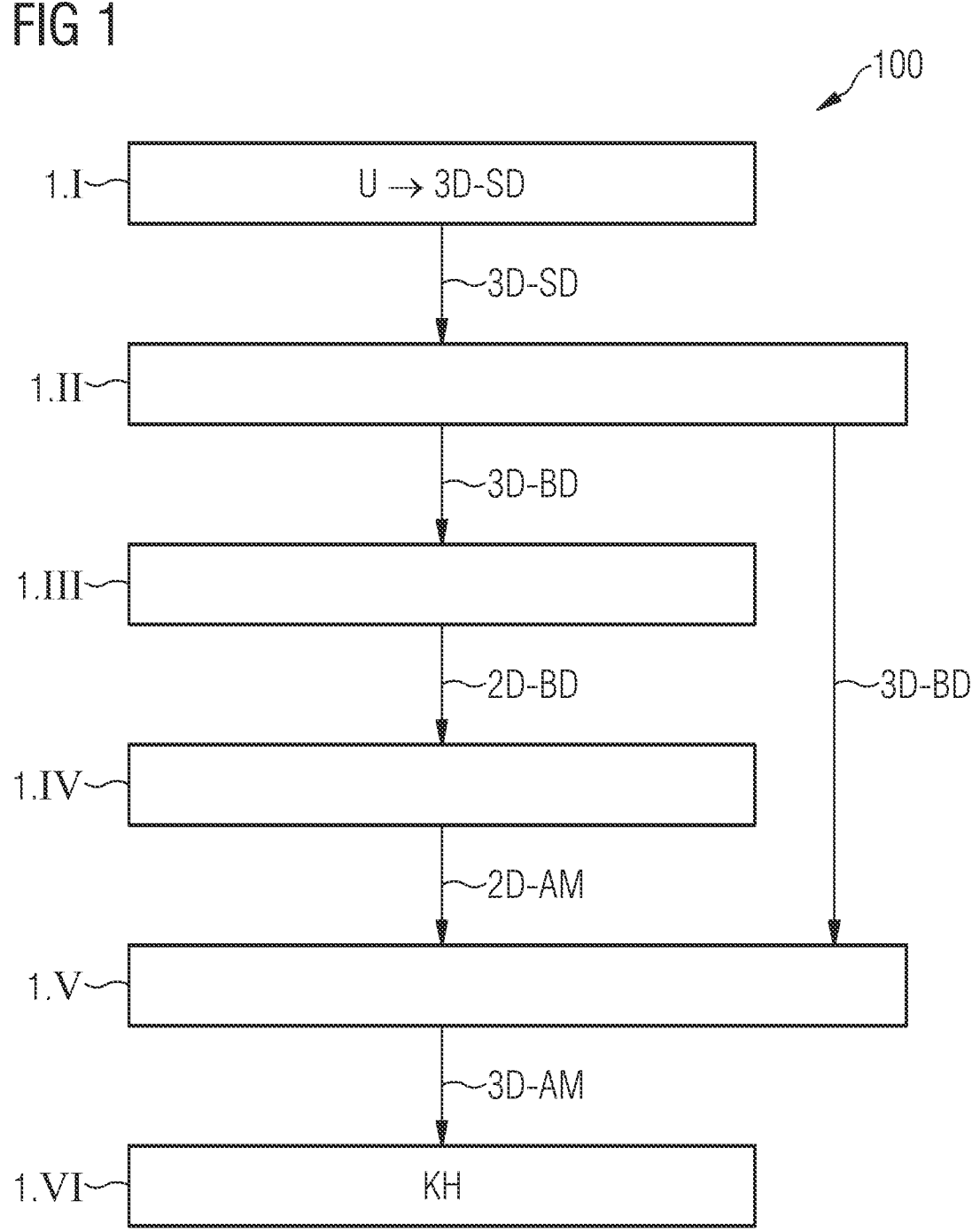
FIG. 1 shows a flowchart, which illustrates a method of obstacle detection for a rail vehicle according to one exemplary embodiment of the invention.

FIG. 1 shows a flowchart 100, which illustrates a method of obstacle detection for a rail vehicle according to one exemplary embodiment of the invention.

Figure 6:
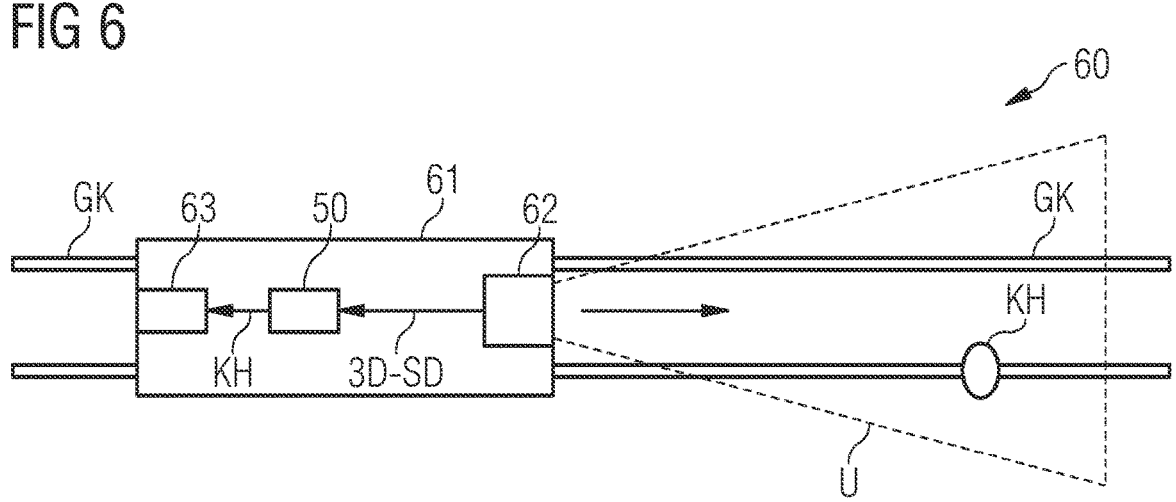
FIG. 6 shows a schematic representation of a rail vehicle according to one exemplary embodiment of the invention.

Three-dimensional sensor data 3D-SD is captured in step 1.I from the surroundings or a surrounding area U of a rail vehicle 61 (see FIG. 6). The 3D sensor data 3D-SD is captured by a sensor unit 62 (see FIG. 6) arranged on the rail vehicle 61. The sensor unit 62 comprises a LIDAR system, whereby three-dimensional sensor data 3D-SD is captured. The sensor data 3D-SD comprises information about the topography of the surrounding area U of the rail vehicle 61. In this exemplary embodiment the surrounding area U comprises a front region upstream of the rail vehicle 61 into which the rail vehicle 61 wants to travel.

Three-dimensional pixel data 3D-BD is then generated as image data in step 1.II from the three-dimensional sensor data 3D-SD. The 3D pixel data comprises, for example, what is known as point cloud data, which represents the distances of the LIDAR system captured by the LIDAR system from reflective surfaces of an object in the monitored surrounding area U.

Two-dimensional image data 2D-BD is generated in step 1.III on the basis of the 3D pixel data 3D-BD. For this, the 3D pixel data is projected onto a 2D plane, which is perpendicular to the orientation of the sensor unit 62. More specifically, actually two types of 2D image data 2D-BD are generated, namely what is known as intensity data I-BD (see FIG. 2) and what is known as distance data or depth data D-BD (see FIG. 2). The intensity data I-BD reproduces information about the intensity of the reflection of the LIDAR waves at the surfaces of the surroundings U of the rail vehicle 61 and the distance data or depth data D-BD comprises information with regard to the distances of the surfaces reflecting the LIDAR waves from the sensor unit or the LIDAR system.

A 2D anomaly mask 2D-AM is generated in step 1.IV by comparing the 2D image data 2D-BD with reference image data R-BD free of an obstacle KH. Pixels are identified as mask pixels in the 2D image data 2D-BD, which are not included in the reference image data R-BD or which differ from the corresponding image regions in the reference image data. The procedure implemented in step 1.IV will be explained in more detail in conjunction with FIG. 3.

A 3D anomaly mask 3D-AM is generated in step 1.V in the 3D pixel data 3D-BD by fusing the 2D anomaly mask 2D-AM with the 3D pixel data 3D-BD generated in step 1.II. Fusion can be taken to mean a type of back projection of the 2D anomaly mask 2D-AM in the 3D image 3D-BD. The 3D pixel data or image data, which is affected by the back projection, is conceived or marked as the 3D anomaly mask 3D-AM.

The 3D pixel data or image data 3D-BD incorporated by the 3D anomaly mask 3D-AM is interpreted in step 1.VI as a possible collision obstacle KH.

Figure 2:
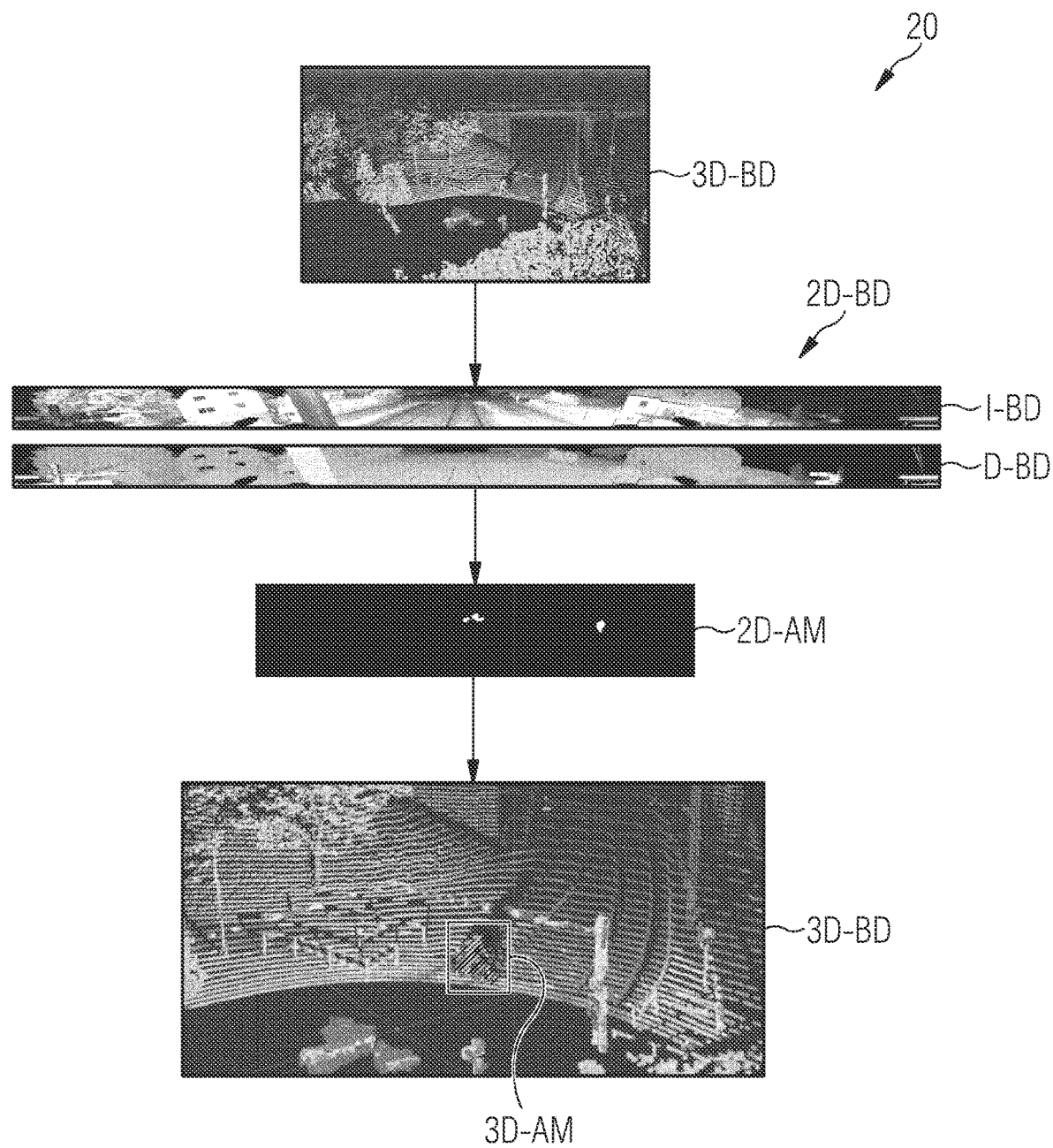
FIG. 2 shows a schematic representation of different types of image data, which are generated in the method illustrated in FIG. 1.

FIG. 2 shows a schematic representation 20 of different types of image data 3D-BD, 2D-BD, I-BD, D-BD, 2D-AM, 3D-AM, which is generated in the method illustrated in FIG. 1.

The uppermost image in FIG. 2 is a pixel image having the 3D pixel data 3D-BD generated in step 1.II, which data represents a point cloud, which is generated by an on-board LIDAR sensor of a rail vehicle from the surroundings of a rail vehicle.

The second uppermost double image 2D-BD comprises two different types of image data arranged one below the other, namely two-dimensional intensity image data I-BD and two-dimensional distance image data D-BD, or also called depth image data. Both types of image data are required when generating the 2D anomaly mask 2D-AM in step 1.IV.

The second lowest image shows a two-dimensional anomaly mask 2D-AM, as was generated in step 1.IV. As may be seen in FIG. 2, the two-dimensional anomaly mask 2D-AM has only two small, narrowly delimited, light regions, while all remaining image sections are dark, and this means that in these image sections there is no difference between the projected 2D image data 2D-BD and the reference image data R-BD.

The lowest image in FIG. 2 again shows the 3D pixel image, already represented as the uppermost image, comprising the 3D pixel data 3D-BD, albeit now enhanced by a 3D anomaly mask 3D-AM based on the 2D anomaly mask 2D-AM, which marks the pixels present in the 3D pixel image, which are to be assigned to a possible collision object or collision obstacle KH.

Figure 3:
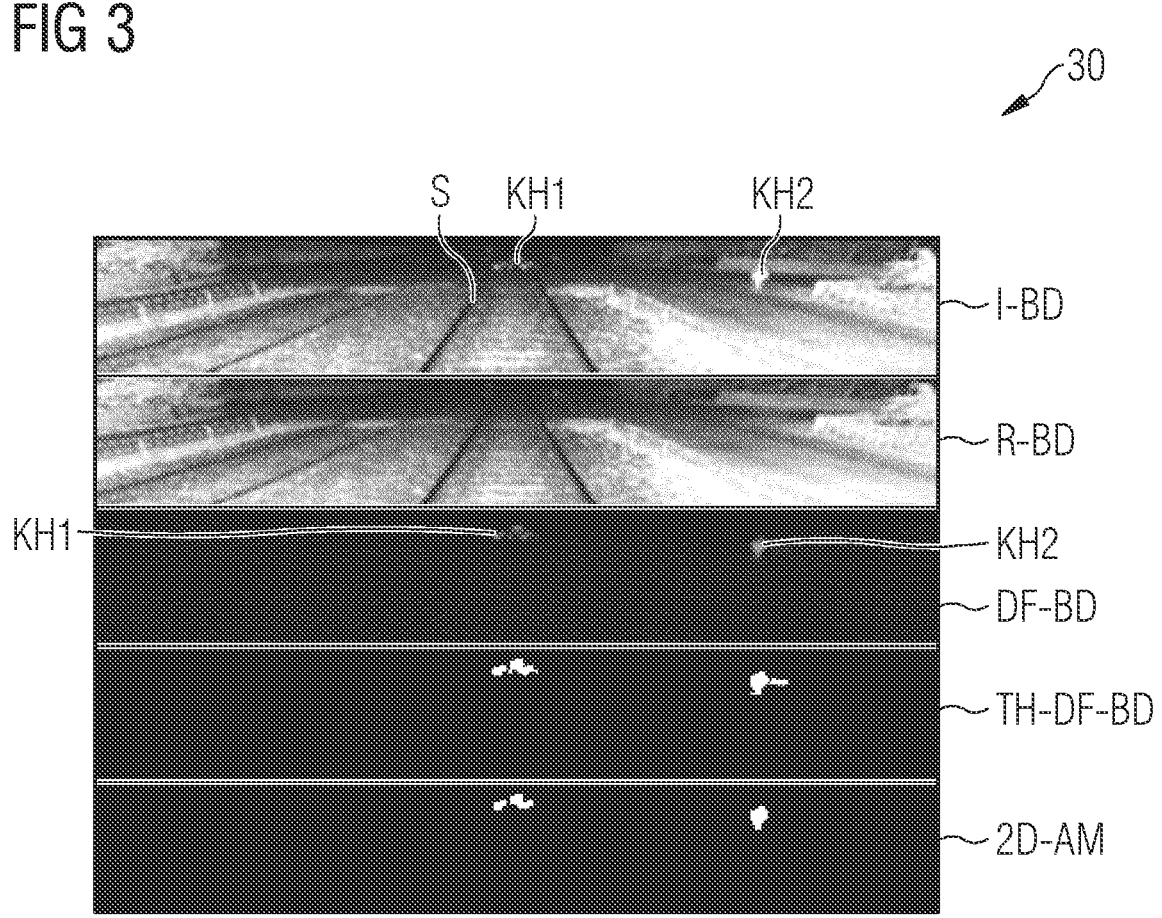
FIG. 3 shows a schematic representation of the steps for forming an anomaly mask.

FIG. 3 shows a schematic representation 30 of the steps for forming an anomaly mask 2D-AM. Different image datasets I-BD, R-BD, DF-BD, TH-DF-BD, 2D-AM are generated during the course of this process. FIG. 3 therefore represents these five types of image I-BD, R-BD, DF-BD, TH-DF-BD, 2D-AM generated during the method illustrated in FIG. 1 directly one below the other.

Two-dimensional intensity data I-BD is shown right at the top, and this reproduces possible collision objects, such as a car KH1 and a pedestrian KH2, and is generated on the basis of the 3D sensor data 3D-SD captured by the sensor unit 62 of the rail vehicle 61 by way of a projection in the two-dimensional space. The two-dimensional intensity data I-BD is incorporated by the 2D image data 2D-BD generated in step 1.III (see FIG. 1) therefore. The car KH1 is currently in front of the rail vehicle 61 or the sensor unit 62 of the rail vehicle 61 on the rails on which the rail vehicle 61 is also on the move. The pedestrian KH2 can be seen further to the right in the image outside of the rails S.

A reference image R-BD is shown as the next image in FIG. 2, which is reconstructed with what is known as a variational autoencoder VAR on the basis of the 3D sensor data 3D-SD of the sensor unit 61 of the rail vehicle 62. The variational autoencoder VAR is trained to transfer only stationary features of the 3D sensor data 3D-SD into a two-dimensional image R-BD, so no collision objects KH1, KH2 occur in the reference image R-BD since the variational autoencoder VAR has not learnt the reconstruction of these objects KH1, KH2 in the training phase. The reference image R-BD is reconstructed as a grayscale image on the basis of grayscale data, so a training procedure and a processing procedure are very efficient and manage with few data storage units. For this reason such reference image R-BD can also be reconstructed in real time with few specialized computers.

FIG. 2 shows as a third image from the top a differential image DF-BD, which is generated on the basis of a difference between the intensity image I-BD and the reference image R-BB. Advantageously, this differential image DF-BD shows only the possible collision objects KH1, KH2 or a mask of these collision objects KH1, KH2.

FIG. 2 shows as a fourth image from the top a threshold differential image TH-DF-BD, with intensity data, which overshoots a predetermined threshold value, being represented, with a standardized high intensity, so as to be very much lighter than in the differential image DF-BD. Noise effects or interference effects on the generation of the anomaly mask are reduced in this way.

FIG. 2 shows as a fifth image from the top or as the lowest image a 2D anomaly mask 2D-AM. The 2D anomaly mask 2D-AM is formed by fusing the threshold differential image TH-DF-BD with a distance image D-BD (see FIG. 2).

Figure 4:
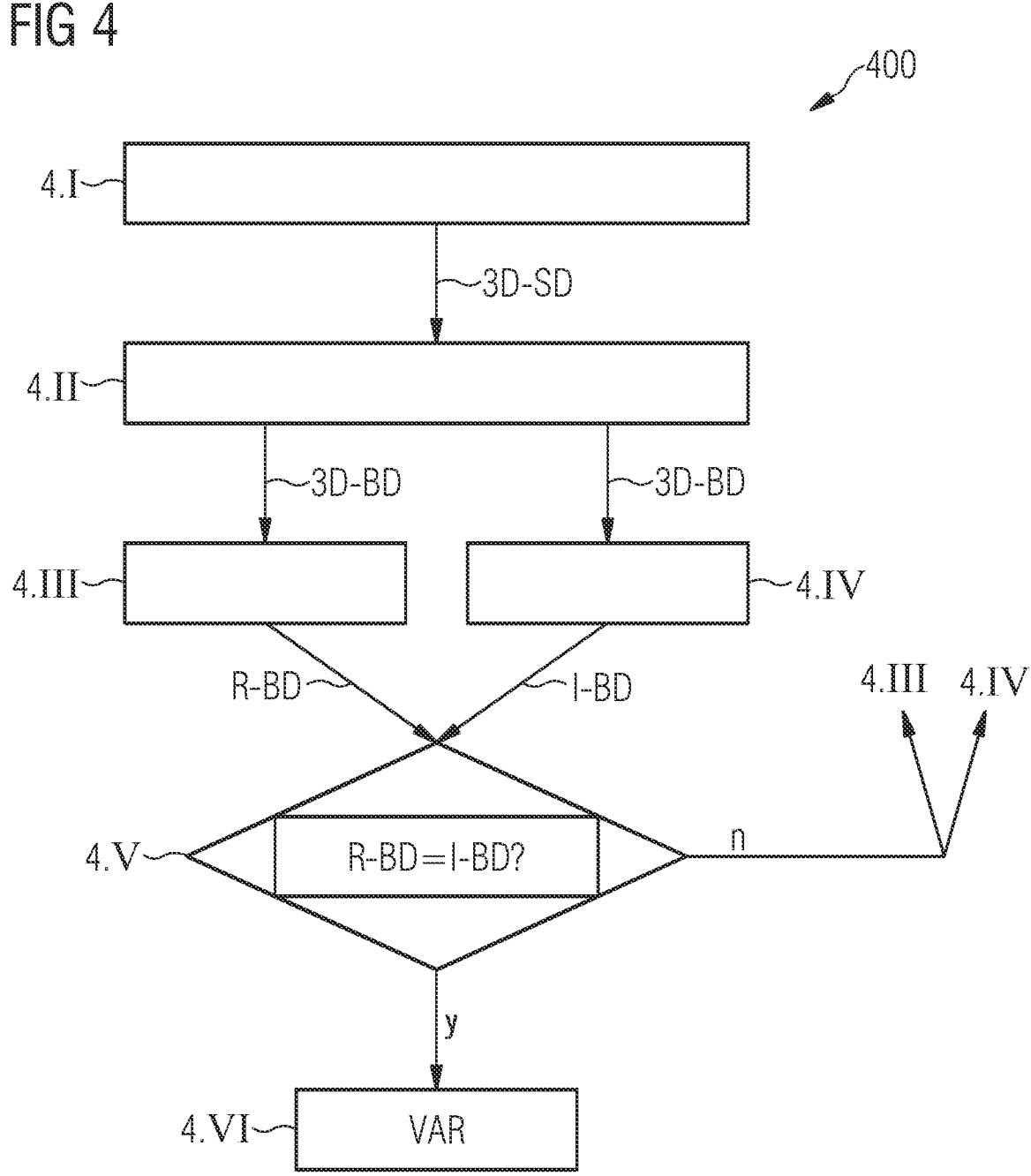
FIG. 4 shows a flowchart, which illustrates a training method for training a variational autoencoder according to one exemplary embodiment of the invention.

FIG. 4 shows a flowchart 400, which illustrates a training method for training a variational autoencoder VAR according to one exemplary embodiment of the invention. The variational autoencoder VAR reconstructs a collision obstacle-free reference image R-BD on the basis of 3D image data 3D-BD, which image can be used in step 1.IV shown in FIG. 1 for generating a 2D anomaly mask 2D-AM.

During the course of the training method, which can be carried out, for example, during travel of a rail vehicle during which no possible collision obstacles occur, 3D sensor data 3D-SD is firstly captured in step 4.I from a surrounding area U of a rail vehicle 61. Three-dimensional pixel data 3D-BD is generated in step 4.II on the basis of the captured sensor data 3D-SD. Reference image data R-BD is now reconstructed in step 4.III on the basis of the 3D pixel data 3D-BD. Since there are no moving objects or potential collision obstacles present in the 3D pixel data, the neural network VAR does not learn to detect objects of this kind in this step either, and to classify and likewise reconstruct them. Intensity images I-BD are generated directly by way of projection in step 4.IV also on the basis of the 3D pixel data 2D-BD.

The reconstructed reference image data R-BD is then compared in step 4.V with the directly generated intensity images I-BD. For the case where the two images R-BD, I-BD are sufficiently identical, and this is indicated in FIG. 4 by "y", the method skips to step 4.VI and the variational autoencoder is deemed to be adequately trained.

For the case where the two images R-BD, I-BD are still not sufficiently identical, and this is indicated in FIG. 4 by "n", the variational autoencoder VAR is adjusted and the method skips to steps 4.III, 4.IV and the training process is repeated until it has been ascertained that the variational autoencoder VAR has been sufficiently trained, so the reference image data R-BD and the intensity image data I-BD adequately match.

Figure 5:
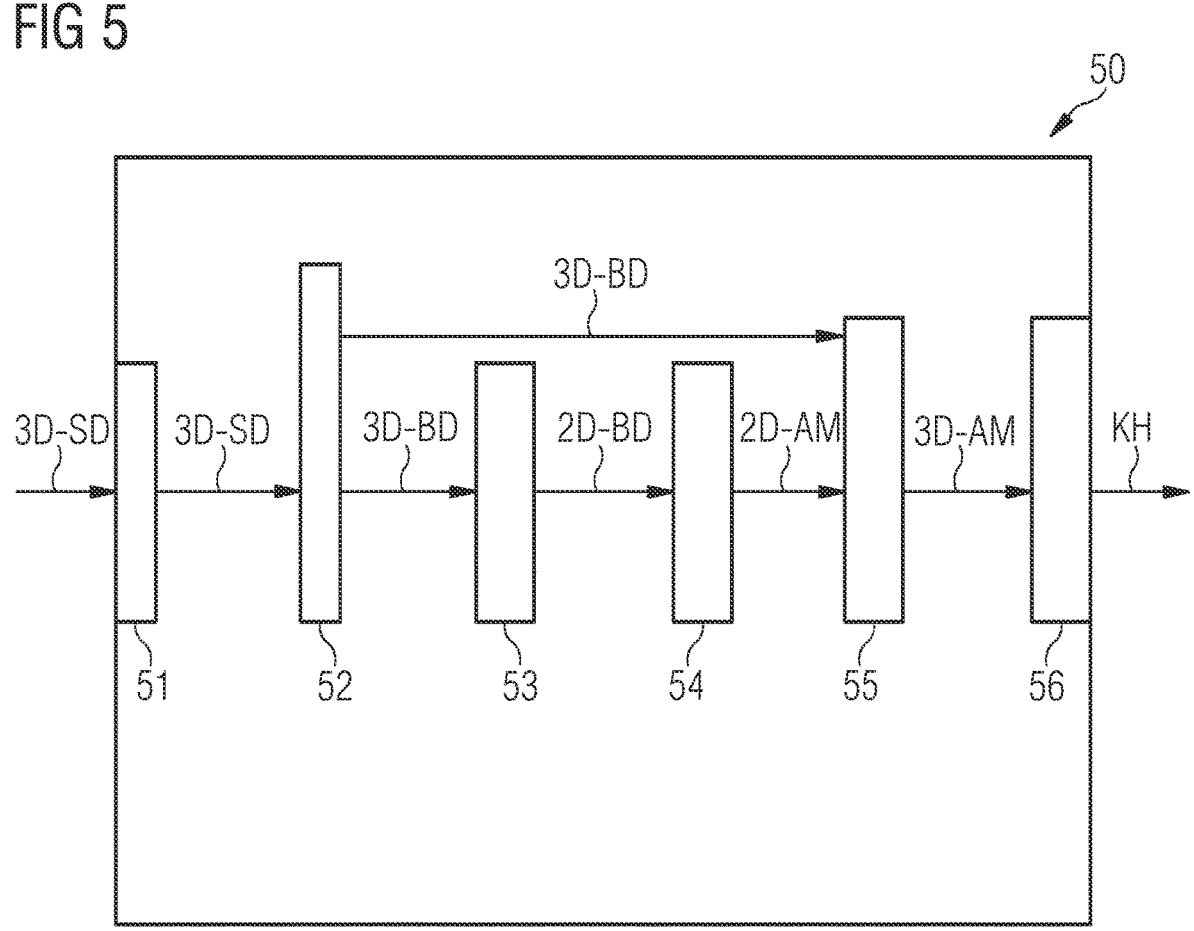
FIG. 5 shows a schematic representation of an obstacle detection facility according to one exemplary embodiment of the invention.

FIG. 5 shows a schematic representation of an obstacle detection facility 50 according to one exemplary embodiment of the invention.

The obstacle detection facility 50 comprises a sensor data interface 51 represented on the left in FIG. 5. The sensor data interface 51 is configured to receive 3D sensor data 3D-SD from a surrounding area U of a rail vehicle 61 in which the obstacle detection facility 50 is arranged. The 3D sensor data 3D-SD is transmitted to an image-generating unit 52 incorporated by the obstacle detection facility 50 and which is embodied to generate 3D pixel data 3D-BD on the basis of the 3D sensor data 3D-SD. Furthermore, the obstacle detection facility 50 also comprises a projection unit 53, which generates 2D image data 2D-BD on the basis of the 3D pixel data 3D-BD by way of a projection. Part of the obstacle detection facility 50 is also a mask-generating unit 54, which is configured to generate a 2D anomaly mask 2D-AM by comparing the 2D image data 2D-BD with reference image data R-BD, free of an obstacle, generated by an AI-based reconstruction. During this process pixels are identified as mask pixels in the 2D image data 2D-BD, which are not included in the reference image data R-BD. The 2D anomaly mask 2D-AM is transferred to a fusion unit 55 which is configured to generate a 3D anomaly mask 3D-AM in the 3D sensor data 3D-SD by fusing the 2D anomaly mask 2D-AM with the 3D pixel data 3D-BD. Part of the obstacle detection facility 50 is also an obstacle-ascertaining unit 56, which is configured to interpret the 3D pixel data 3D-BD incorporated by the 3D anomaly mask 3D-AM as a possible collision obstacle KH.

FIG. 6 illustrates a schematic representation 60 of a rail vehicle 61 according to one exemplary embodiment of the invention. The rail vehicle 61 schematically represented on the left in FIG. 6 travels from left to right in the direction of the arrow on a rail track GK and captures three-dimensional sensor data 3D-SD from a surrounding area U situated in front of the rail vehicle 61. For this, the rail vehicle comprises in its front region a sensor unit 62. The 3D sensor data 3D-SD is transmitted to an obstacle detection facility 50, which is likewise part of the rail vehicle 61 and has the construction illustrated in FIG. 5.

The obstacle detection facility 50 now ascertains on the basis of the 3D sensor data 3D-SD that a collision obstacle KH is situated in the surroundings, more specifically on the right-hand rail of the rail track GK shown in FIG. 6. This result KH is transmitted to a control facility 63 incorporated by the rail vehicle 61 which transmits control commands to individual functional units of the rail vehicle 61 in response to this collision obstacle KH. For example, the brakes of the rail vehicle 61 are actuated to stop the rail vehicle 61 before the collision obstacle.

In conclusion it is pointed out once again that the previously described methods and apparatuses described are merely exemplary embodiments of the invention and that a person skilled in the art can vary the invention without departing from the scope of the invention insofar as it is specified by the claims. For the sake of completeness it is also pointed out that use of the indefinite article "a" or "an" does not preclude the relevant features from also being present multiple times. Similarly, the term "unit" does not preclude this from being composed of a plurality of components, which can optionally also be spatially distributed.

The invention claimed is:

1. A method of obstacle detection for a rail vehicle, the method comprising:
  capturing 3D sensor data from a surrounding area of the rail vehicle;
  generating 3D image data based on the 3D sensor data;
  generating 2D image data based on the 3D image data;
  generating a 2D anomaly mask by comparing the 2D image data with reference image data that is free of a collision obstacle, wherein an image region is identified as a mask region in the 2D image data which differs from a corresponding image region in the reference image data;
  generating a 3D anomaly mask in the 3D image data by fusing the 2D anomaly mask with the 3D image data;
  identifying the 3D image data encompassed by the 3D anomaly mask as a possible collision obstacle.

2. The method according to claim 1, wherein the step of generating the 2D image data comprises projecting the 3D image data onto a plane, which coincides with a perspective of a sensor unit of the rail vehicle used for capturing the 3D sensor data.

3. The method according to claim 1, wherein the 3D sensor data comprises LIDAR sensor data.

4. The method according to claim 1, wherein the 2D image data comprises an intensity image and a distance image.

5. The method according to claim 1, wherein the 2D image data comprises grayscale image data.

6. The method according to claim 1, which comprises constructing, based on the 2D image data, 2D reference image data which does not comprise any obstacle objects.

7. The method according to claim 6, which comprises reconstructing the 2D reference image data by artificial intelligence.

8. The method according to claim 7, wherein the artificial intelligence comprises an artificial neural network.

9. The method according to claim 7, wherein the artificial intelligence comprises a variational autoencoder.

10. The method according to claim 7, which comprises training the artificial intelligence during stages of travel, in which the rail vehicle has a clear line, for a reconstruction of obstacle-free 2D reference image data.

11. The method according to claim 10, which comprises selecting the stages of travel for the training step in terms of whether the rail vehicle is currently traveling at a predetermined minimum speed.

12. The method according to claim 1, wherein the surrounding area of the rail vehicle that is captured by way of sensors comprises a travel channel of the rail vehicle extending in front of the rail vehicle.

13. An obstacle detection facility, comprising:
a sensor data interface for receiving 3D sensor data from a surrounding area of a rail vehicle;
an image-generating unit connected to receive the 3D sensor data and configured for generating 3D image data on a basis of the 3D sensor data;
a projection unit connected to receive the 3D image data and configured for generating 2D image data on a basis of the 3D image data;
a mask-generating unit configured for generating a 2D anomaly mask by comparing the 2D image data with reference image data that is free of a collision obstacle, and identifying an image region as a mask region in the 2D image data which differs from a corresponding image region in the reference image data;
a fusion unit configured for generating a 3D anomaly mask in the 3D image data by fusing the 2D anomaly mask with the 3D image data; and
an obstacle-ascertaining unit configured for identifying the 3D image data encompassed by the 3D anomaly mask as a possible collision obstacle.

14. A rail vehicle, comprising:
a sensor unit for capturing 3D sensor data from surroundings of the rail vehicle;
an obstacle detection facility according to claim 13; and
a control facility for controlling a travel behavior of the rail vehicle as a function of whether said obstacle detection facility has detected a collision obstacle in the surroundings of the rail vehicle.

15. A non-transitory computer program product comprising a computer program, to be directly loaded into a memory unit of a control facility of a rail vehicle, said computer program having program segments configured to carry out the method according to claim 1 when the computer program is executed in the control facility.

16. A non-transitory computer-readable medium on which program segments are stored, for execution by a computer unit, in order to carry out the method according to claim 1 when the program segments are executed by the computer unit.

\* \* \* \* \*